United States Patent
Rao et al.

(10) Patent No.: US 7,876,229 B2
(45) Date of Patent: Jan. 25, 2011

(54) FLARE MONITORING

(75) Inventors: Venkatagiri S. Rao, Bangalore (IN); Vijendran G. Venkoparao, Bangalore (IN); Rudra N. Hota, Jajpur (IN); Mahesh K. Gelinboina, Andhra Pradesh (IN)

(73) Assignee: Honeywell International Inc., Morristown, NJ (US)

( * ) Notice: Subject to any disclaimer, the term of this patent is extended or adjusted under 35 U.S.C. 154(b) by 754 days.

(21) Appl. No.: 11/891,999

(22) Filed: Aug. 14, 2007

(65) Prior Publication Data

US 2009/0046172 A1 Feb. 19, 2009

(51) Int. Cl.
 *G08B 17/12* (2006.01)
(52) U.S. Cl. ...................................... 340/577; 250/554
(58) Field of Classification Search .................. 340/577, 340/578, 628; 250/534; 382/162, 164, 165
 See application file for complete search history.

(56) References Cited

U.S. PATENT DOCUMENTS

| | | | |
|---|---|---|---|
| 4,233,596 A | 11/1980 | Okamoto et al. | |
| 5,289,275 A | 2/1994 | Ishii et al. | |
| 5,510,772 A * | 4/1996 | Lasenby | 340/578 |
| 5,937,077 A * | 8/1999 | Chan et al. | 382/100 |
| 6,278,374 B1 * | 8/2001 | Ganeshan | 340/578 |
| 6,373,393 B1 * | 4/2002 | Matsukuma et al. | 340/578 |
| 6,956,485 B1 | 10/2005 | Aird et al. | |
| 2003/0040815 A1 | 2/2003 | Pavlidis | |

OTHER PUBLICATIONS

Tax, D. , "One-class classification: Concept-learning in the absence of counter-examples", *Ph.D thesis, Delft University of Technology,* http://www-ict.ewi.tudelft.nl/~davidt/papers/thesis.pdf,(Jun. 2001), 1-202.
Zarit, B. D., et al., "Comparison of five color models in skin pixel classification", *International Workshop on Recognition, Analysis and Tracking of Faces and Gestures in Real-Time Systems, 1999. Proceedings.*, (1999),58-63.

* cited by examiner

*Primary Examiner*—Toan N Pham
(74) *Attorney, Agent, or Firm*—Schwegman, Lundberg & Woessner, P.A.

(57) ABSTRACT

A computer assisted method identifies characteristics of a flare. A digital image of the flare is obtained, such as by a color digital video camera and a region of interest likely containing the flare is identified. Flare pixels within the region of interest are identified and color information is extracted from such flare pixels. The extracted color information is associated to characterizations of the flare, and an operator is provided an alert when such characterizations indicate an abnormal flare.

19 Claims, 7 Drawing Sheets

FLARE MONITORING

BACKGROUND

In petroleum refineries, it is a common practice to burn the exhaust gases of a stage of the refinery before releasing them to the atmosphere in order to reduce the environment pollution. The color of the flare at any given time is the result of the constituents of the gases that are present in the flare. The volume of the flare indicates the quantity of gas that is getting released in the refining process. Hence, in an indirect way, the parameters such as color, volume etc. of the flare indicate the performance of the particular stage in the refining process.

In many oil refineries, the flare is manually observed by the operator for any abnormality. Manual observation of the flare on a 24×7 basis is a difficult job, and is not a reliable way to detect abnormalities. Some prior methods of analyzing the flare include the use sensors working in the infrared spectrum to gather information about the flare, and using intensity and color measurements to estimate flare temperature.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In petroleum refineries, it is a common practice to flare up the exhaust gases before releasing them to the atmosphere in order to reduce the environment pollution. The color of the flare at any given time is decided by the constituents of the gases that are present in the flare. The volume of the flare indicates the quantity of gas that is getting released in the refining process. Hence, in an indirect way, these parameters of flare indicate the performance of the particular stage in the refining process.

It is difficult for an operator to continuously manually monitor a flare to look for abnormalities. Various embodiments described herein implement a methodology that automatically estimates flare characteristics to alert an operator of abnormalities. Control measures may be taken in case of abnormality. In one embodiment, a method detects and analyzes the characteristics of a flare using video frames obtained from a standard color video camera.

Figure 1A:
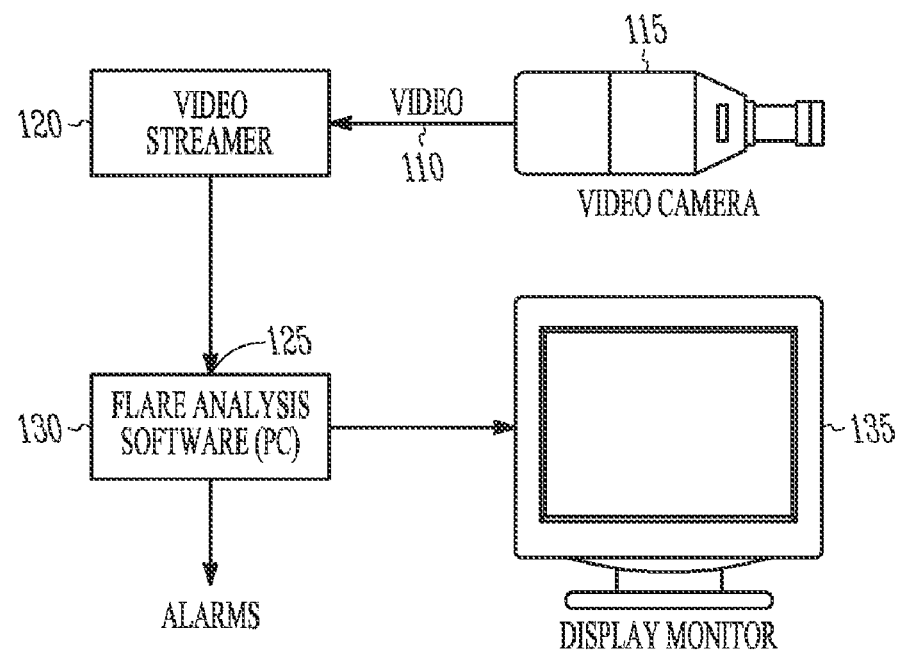
FIG. 1A is a block diagram of a system to estimate flare characteristics to alert an operator according to an example embodiment.
Figure 1B:
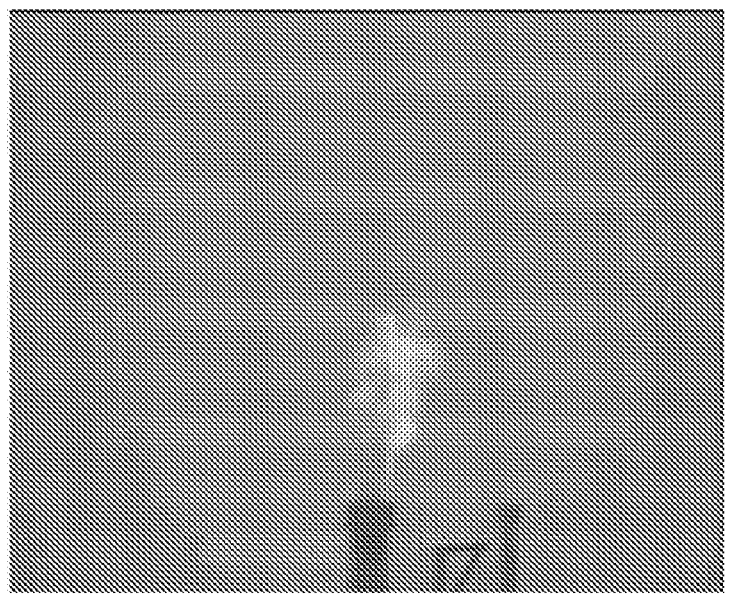
FIG. 1B is a photograph of a flare according to an example embodiment.

As illustrated in FIG. 1A, a video output 110 from a color video camera 115 is fed to a video streamer 120 which converts the incoming analog video into digital video and output images in JPEG format through an Ethernet port 125. Software 130 residing in a computer, such as a personal computer (PC) reads this JPEG image data and converts each image into an RGB bitmap image and then used for analysis. In further embodiments, the camera 115 may directly provide digital output and may be directly coupled to a computer running software, or wirelessly via a wireless network. There are many different ways of hardware configuration for obtaining digital images such as that shown in FIG. 1B for use in monitoring a flare.

In one embodiment, a standard color TV camera, such as a PTZ type camera, is used to capture digital video of the flare. The TV camera location and its field of view are chosen suitably to ensure that flare occupies at least 10% of screen size on the monitor in one embodiment. The camera video is fed to a frame grabber located within a computer system, such as a personal computer (PC) to obtain digitized video frames. A display 135 may display images and results from the software 130.

Figure 2:
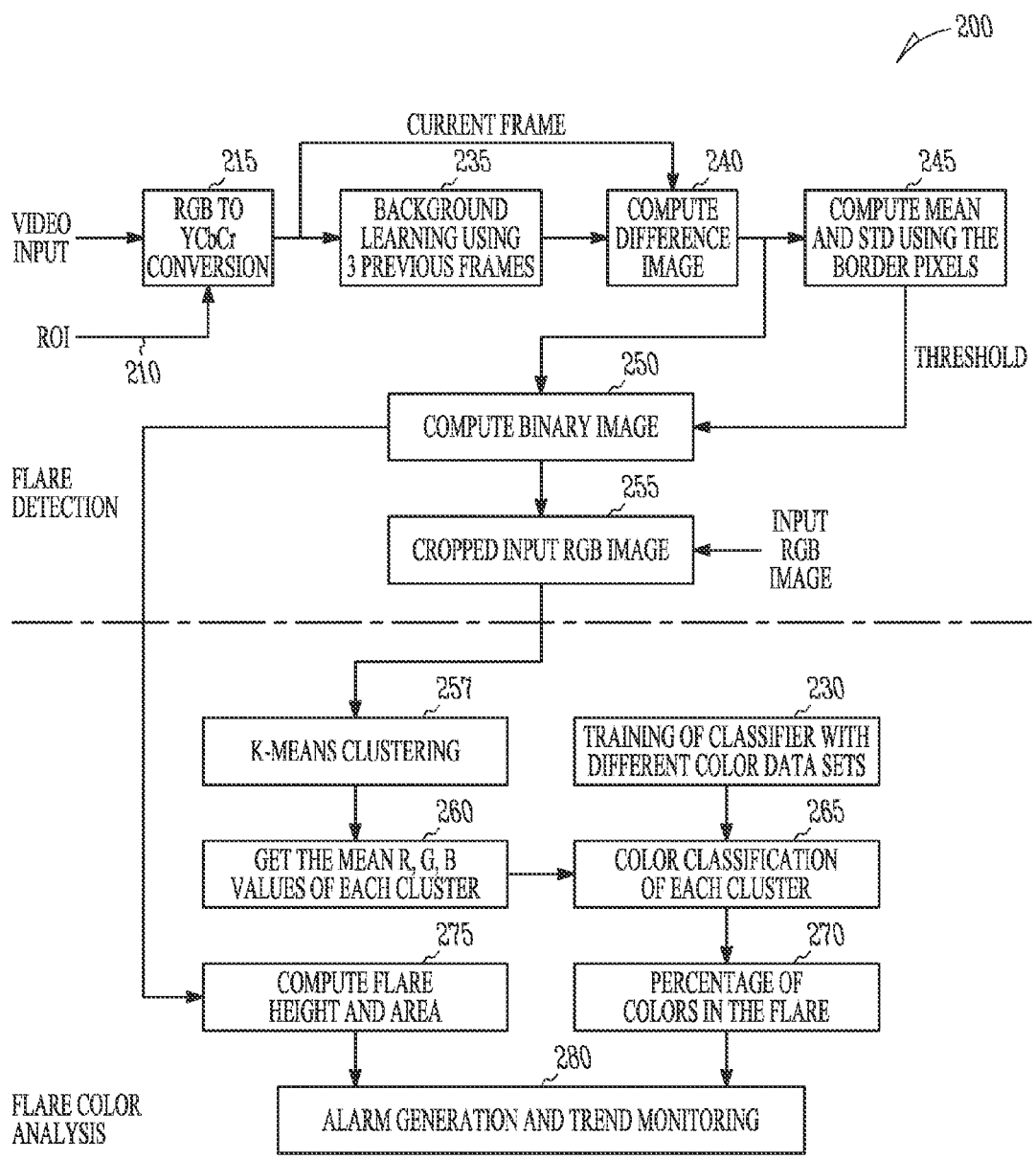
FIG. 2 is a block diagram of a computer implemented method of estimating flare characteristics according to an example embodiment.
Figure 3:
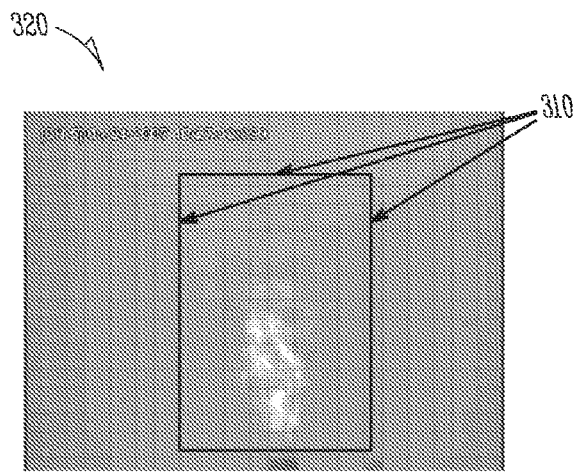
FIG. 3 illustrates a selected region of interest (ROI) for flare analysis according to an example embodiment.

Alternatively, digitized video can be obtained through a streamer (MPEG/JPEG) coupled to the camera. A standard PC keyboard and mouse along with a suitable GUI (displayed on the monitor) may be used for enabling and disabling various functionalities and to set the required parameters for executing the various methods described FIG. 2 is a block diagram of an example method 200 that includes both training of expert systems and estimating flare characteristics to alert an operator. The method 200 includes determining a broad region of interest in a digital video image where the flare is likely to be present at 210 and converting a video RGB input to YCbCr in one embodiment. Such conversion may not be needed in further embodiments which may operate in different color spaces or may directly receive video input in a desired format. In one embodiment the ROI may be identified via a manual drawing on the video image as shown in FIG. 3, using an input device, such as a mouse, touchpad or any other data entry device that provides the ability to identify a region of interest 310 on a video image 320. In further embodiments, the ROI may include the entire video image, or a portion of the video image identified automatically, such as by detection of the flare and addition of an area around the flare to ensure abnormal flare conditions are likely to be within the ROI. There are many different ways to define such an ROI that help reduce the amount of processing required for larger areas than needed.

At 230, manual or automated training of the classifier is performed using historical data for flare color analysis. Initial detection of the flare area within the region of interest may be done using background subtraction 235, 240 and thresholding 245. At 235, background learning is done in one embodiment using three previous frames. Statistics, such a mean and standard deviation using border pixels are computed at 245 from a computed difference image at 240. A binary image is computed at 250 using a threshold from block 245 and the computed difference image 240.

At 255, a cropped input RGB image is derived from the binary image and an input RGB image. K-means clustering is performed at 257, and mean R.G.B. values of each cluster are obtained at 260. At 265, analysis of color constituents of flare is performed, and correlated at 270 with gas type using the trained classifier. Flare height and area are calculated at 275 using the mean R.G.B. values and the binary image information. An alarm may be generated at 280 as a function of the detection of abnormal conditions, including flare area and height, and indications from the classifier. By analyzing the color of the flare it is possible to identify the gas type provided only one gas is vented through the stack at any given time.

Flare Detection

In one embodiment, the incoming RGB image of a video frame is first converted into a YCbCr image. The pixel gray values within the ROI area of the YCbCr image are averaged over previous three consecutive frames to generate background image. In one embodiment, such background images are generated for every three consecutive frames, such as frames 1, 2, 3, frames 2, 3, 4, and so on. Frames may be captured at standard video rates, such as 25 to 30 frames per second, which works well for the dynamic image of flares. For extremely dynamic flares the capture rate may be faster if desired, or even slower if the flares are not very dynamic.

The ROI area of the current video frame (YCbCr channels) and the background images are subtracted from each other to generate an absolute difference image and then thresholded to obtain a binary image. For the purpose of thresholding, the mean and standard deviation of the border pixels along the ROI area of the difference image may be computed and then used. In the binary image, the background is represented by gray value zero and the foreground, that corresponds to flare area is represented by a value "255". The total count of pixels with value "255" within the ROI gives the area of flare in terms of pixels. One algorithm is described below.

Let $I_{yt-1}$, $I_{yt-2}$ and $I_{yt-3}$ represent the past three video frames corresponding to the Y channel of the image within the ROI. Similarly the Cb and Cr channel images are represented by their corresponding subscripts. The background image is represented as:

Background Y image $B_{yt}=(I_{yt-1}+I_{yt-2}+I_{yt-3})/3$

Let the current Y channel image be $I_{yt}$, then

Absolute Difference image $A_{yt}=|B_{yt}-I_{yt}|$

Let $\mu_y$ and $\sigma_y$ be the mean gray level and standard deviation along the ROI border of $A_{yt}$ Similarly for Cb and Cr channel images, $\mu$ and $\sigma$ may be computed from the corresponding absolute difference images. The segmentation of flare region from background may be done as follows.

If $\{I_{yt}(p,q)-B_{yt}(p,q)>(\mu_y+2\sigma_y)\}$ AND $[\{I_{cbt}(p,q)-B_{cbt}(p,q)>(\mu_{cb}+2\sigma_{cb})\}$ OR $\{I_{crt}(p,q)-B_{crt}(p,q)>(\mu_{cr}+2\sigma_{cr})\}]$ Binary Image (p,q)=255
Else
Binary Image (p,q)=0

Where $I_{cbt}$, $I_{crt}$ represent the current image frames corresponding to Cb and Cr channels and $B_{cbt}$, $B_{crt}$ are the corresponding Background images obtained from the average of past three frames. 'p' and 'q' represent the pixel location in terms of row and column indices. The Binary Image pixels with gray level "255" represent the segmented flare pixels.

Figure 4A:
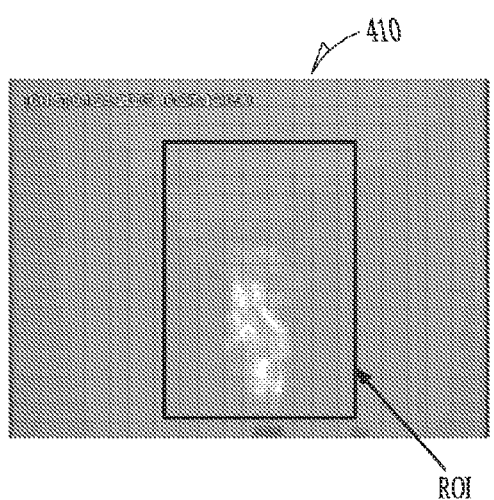
FIGS. 4A and 4B show one sample of an original flare and its binary blob according to an example embodiment.
Figure 4B:
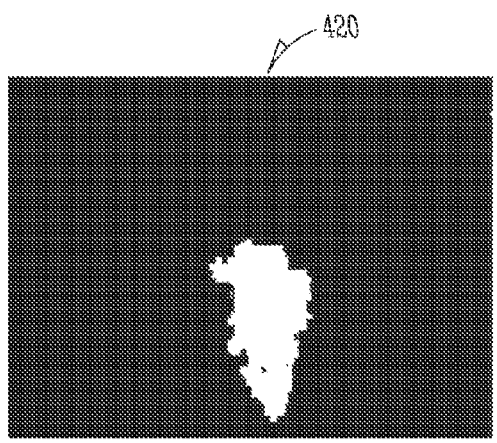

The detection results (flare image 410 and the corresponding binary blob 420 of flare detection) are shown in FIG. 4A and FIG. 4B. Depending on the direction and intensity of wind near the vicinity of the flare, single camera may not be able to capture the full flare and under those situations, two or three cameras need to be deployed to get the full view of the flare. The images from the cameras may be processed independently. In one embodiment, if images from any one of the cameras indicate an abnormal condition, an alarm may be provided. In further embodiments, the different camera results may be weighted, or a decision as to abnormal conditions may be determined by a majority result. In still further embodiments, the wind direction may be obtained and a camera selected as a function of the wind direction may be used In a further embodiment, detection of flare is done by a supervised classifier that classifies each pixel from images of the flare as either a flare pixel or background. This output is used to estimate the area of the flare. The area of the flare is an indicator of the amount of gas that is getting released. An abnormal amount of gas release can be indicated by exact computation of the flare area Flare Detection Using Supervised Classification Method:

In flare detection, the task is to detect the flare region from the given ROI. The detection may be done by a supervised classifier method by classifying each pixel either as flare pixel or background. This output is used to estimate the volume of the flare inside the ROI. The estimate of the volume of the flare is an indicator of the amount of gas getting released. An abnormal amount of gas release may be indicated by exact computation of the flare area. In one embodiment, the area of the flare is computed by first training the classifier and then running it on live data for detection.

Training the flare detection classifiers utilizes some +ve (flare) and −ve (background) patterns. Because of the supervised classification method, the detection classifier uses patterns from both the classes with their labels. The labeled flare patterns can be collected from the ground truthed flare pixel or from known flare pixel clusters. The background patterns can be collected randomly from the color space or from the ground truthed background in the ROI of the flare images. It may be better to use some of the known color transformation before collecting the training pattern. In one embodiment, HSV provides the best result for flare detection.

The ROI region of the image may be transferred to the specified color space before it is fed to the classifier. Then each pixel in the color space becomes the pattern for the classifier. The classifier gives the labels (+1 or −1) to each of pixel as flare or background. The detection result can be further improved by performing a post-processing (e.g. morphological operation for internal gap filling) operation.

The detected flare region may be classified into various components based on the properties of the flare and the corresponding color constituents. In this step, the detected flare pixels from the previous step are further classified into different categories as defined by the user according to the gas properties. The classifier is initially trained with some labeled patterns from each category using a video camera. The classifier is trained to provide an operator alert, such as an alarm or other visual or aural communication to warn the operator in case of any flare abnormality. In addition, the classifier will automatically estimate the amount of gas burnt vis-à-vis the flare area. In one embodiment, the video frames obtained from a standard color video camera and to compare the results of analysis with historical data to detect abnormalities.

Following training of classifiers, flare constituent analysis may be divided into two major functions that may be implemented as software modules in one embodiment. In further embodiments, the functions may be performed by various combinations of hardware, software and firmware if desired. The major functions include a flare region separation function and a flare region classification function. The flare region separation function analyzes flare region within a given ROI (Region of Interest), such as a MBR (minimum bounding rectangle). During flare region classification, the detected flare pixels may be classified into various user defined categories, such as normal and abnormal. The separated flare region is formed into various components based on the properties of the flare and the corresponding color constituents.

Color Classification of the Flare Region:

Different color spaces may be used for color object detection. Example color spaces include RGB, normalized RGB, YCbCr, HSV, TSL, etc. . . . Combinations of different colors may also be used for color object detection. A simple color model can be of the form (a) simple threshold, T1<Cr<T2 and T3<Cb<T4, (b) around the mean, $\mu-\alpha\sigma_{Cb}<Cb<\mu-\alpha v_{Cr}$ and $\mu-\alpha\sigma_{Cb}<Cr<\mu-\alpha\sigma_{Cr}$, (c) elliptical boundary or (d) single or multiple Gaussian, where, Cr and Cb are the features in the transformed color space.

Since the color information of object pixels may not lie within a single cluster in any chosen color space or may not follow any particular distribution, the above models may not be sufficient to fit an optimal boundary for a color model. The approach of applying a non parametric model (LUT [Lookup Table], Bayes Classifier, SVM [support vector machine]) is well suited to handle this problem.

Fitting an optimal boundary for a color model in one embodiment is handled as a pattern recognition task by using classifiers with kernel function such as SVM or SVDD (support vector data descriptor). In such cases the classifier tries to classify pixel by transferring them into a high dimensional feature space where the patterns corresponding to object and background are linearly separated. In other words, it tries to find out the color space with good discrimination or reasonably well separation between them. Detecting objects in color space demands a model that fits into the target object colors without giving much importance to the background color as target color is a subset of the whole color space.

SVM is used in one embodiment as a tool for learning from experimental data. While other tools for learning may be used, SVM's in one embodiment, appear to be more effective than other non-parametric classifiers (e.g., the RBF Neural Networks, Nearest-Neighbor (NN), and Nearest-Center (NC) classifiers) in terms of classification accuracy, computational time, and stability to parameter setting. The other classifiers may be used in further embodiments.

Figure 5:
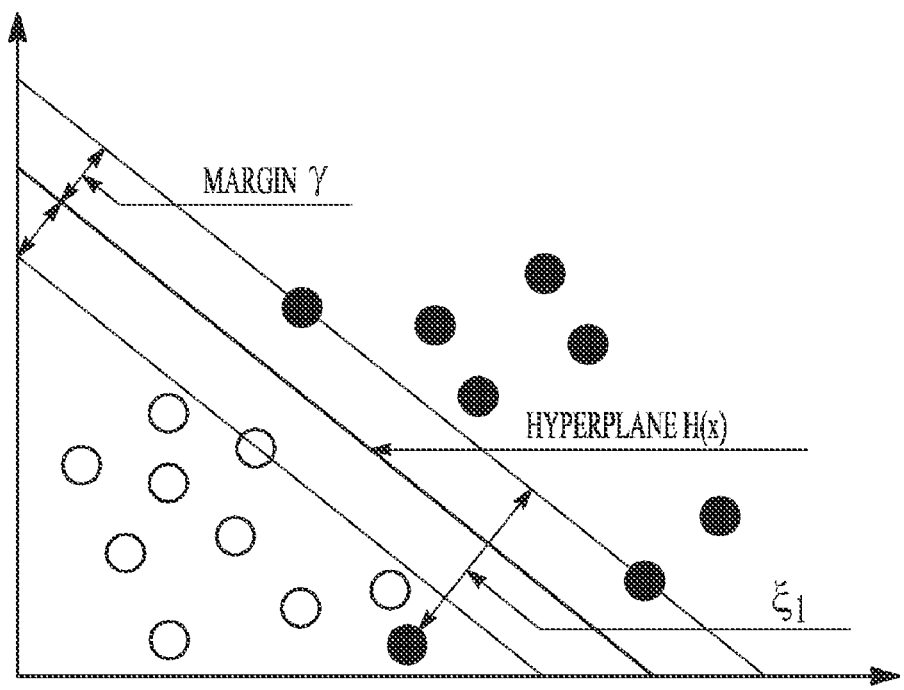
FIG. 5 shows maximum Margin and Slack variable for a flare pixel classification problem according to an example embodiment.

Many hyper-planes can achieve the above separation, but in one embodiment, the one that maximizes the margin (the minimal distance from the hyper-plane to each point) is found. The margin and hyper-plane for a linearly separable class is shown in FIG. 5. A hyper-plane, which is denoted by (w,b) ∈ R"×R, consists of all x satisfying ⟨w,x⟩+b=0. The problem thus can be formed as:

$$\text{Minimize } \frac{1}{2}\|w\|^2 \text{ subject to } y_i(\langle w, x_i \rangle + b) \geq 1. \quad (1)$$

The solution to the optimization problem of SVM's may be given by the saddle point of the Lagrange function. Let C be the upper bound of the Lagrange multipliers $\alpha_i$, and then (1) can be formulated as $$L(\alpha) = \sum_i \alpha_i - \frac{1}{2}\sum_i \sum_j \alpha_i \alpha_j y_i y_j \langle x_i, x_j \rangle \quad (2)$$

$$\text{with constraints } \sum_i \alpha_i y_i = 0 \text{ and } 0 \leq \alpha_i \leq C.$$

Sample Collection for the Training of Color Classifiers:

The training of the flare color analysis classifier in one embodiment utilizes +ve (flare) and −ve (background) patterns for each of the colors. Because of the supervised classification method, the training uses patterns from both the class with their labels. The labeled flare patterns can be collected from the ground truthed flare pixel or from known flare pixel clusters. The background patterns can be collected randomly from the color space or from the ground truthed background in the ROI of the flare images.

Figure 6:
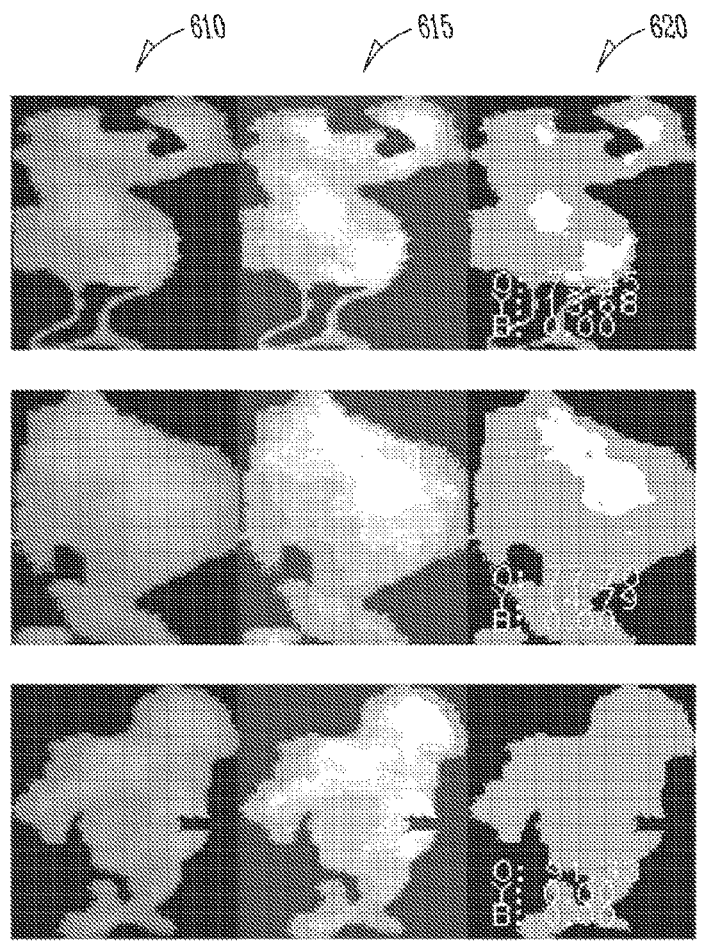
FIG. 6 represents a color analysis of a detected blob according to an example embodiment.

Some of the results are shown in FIG. 6, which indicates color classification in column 610, separated flare region clusters in column 615 and color classification result by classifying the cluster centers in column 620.

The color component of the flare is a very useful cue to analyze different constituents of the gas that is getting released. In this step, the detected flare pixels from the previous stage are further classified into different categories as defined by the user according to the gas properties. In one embodiment the flare pixels are classified to yellow, orange, red and blue regions by trained SVM based classifiers and the percentage of each color present in the flare region is computed. Here also the major steps for classifying the flare pixel are; training of the classifier and classification of the flare pixel into various user defined categories. To classify the flare pixel into various categories, the classifier has to be trained with some labeled patterns from each category and later used within the classifier. This is done in the same way as explained in the previous section.

Some of the results are shown in FIG. 6, which indicates color classification in column 610, separated flare region clusters in column 615 and color classification result by classifying the cluster centers in column 620.

In further embodiments the color classification can be done with one class classifier like SVDD.

Color Classification of the Flare Region Using One Class Classifier:

The color component of the flare is a very useful cue to analyze different constituents of the gas that is being released. Separated flare pixels may be classified into different categories as defined by the user according to the gas properties. In the current work the flare pixels are classified as yellow, orange and blue regions and the percentage of each color present in the fame region is computed. Here, the major steps for classifying the flare pixel are: cluster the flare pixels and classify the cluster centers into various user defined categories.

The above three color classifiers may be applied to the flare regions. The color label in one embodiment is selected according to the maximum confidence value from the classifier by classifying the cluster centers In a further embodiment, SVDD may be used to find an optimal bounding hyper sphere around the target class, wherein the complete coverage of outlier pattern (in one embodiment, its background class) is not required. Hence a one class classifier like SVDD may be a better solution for some embodiments.

Color Model by SVDD:

SVDD-classifier: Support Vector Data Descriptor (SVDD) is a method generally used to describe the data samples. It defines a spherically shaped boundary with minimal volume around the target data set. A best representation of a data set is obtained such that the target class is optimally clustered and can be distinguished from the outlier class. In data domain description, the goal is to accurately describe one class of objects, the target class, as opposed to a wide range of other objects which are not of interest or are considered as outliers.

Figure 7:
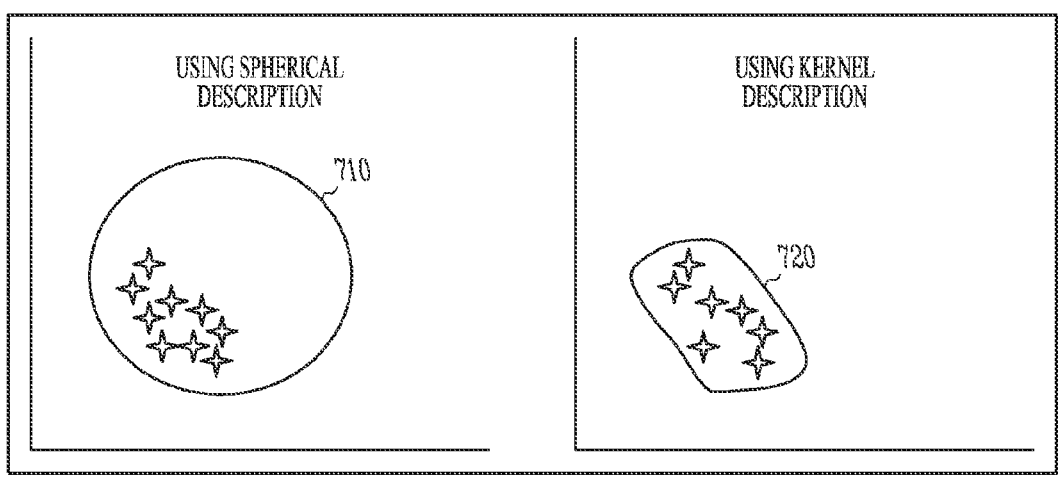
FIG. 7 is a graphical representation of class boundaries with minimum volume according to an example embodiment.

To describe the domain of a data set, the data is enclosed within a hyper-sphere description 710 with minimum volume as illustrated in a graphical representation in FIG. 7. The data may also be enclosed within a kernel description 720. By minimizing the volume of the captured feature space, the error (i.e. the chance of accepting outlier objects) may be minimized. Assume, a dataset contains N sample objects, $X_i$, i=1...N and the hyper-sphere is described by a center 'a' and radius R. To allow the possibility of outliers in the training set, the distance from $X_i$ to the center 'a' must not be strictly smaller than $R^2$, but larger distances should be penalized. Therefore, a slack variable is introduced which measures the distance to the boundary if an object is outside the description. An error L containing the volume of the hyper sphere and the distance from the boundary of the outlier objects is minimized. The solution is constrained with the requirement that (almost) all data is within the hyper sphere:

$$L(R, a, \alpha_i) = R^2 - \sum_i \alpha_i R^2 (x_i^2 - 2ax_i + a^2), \text{ with } \alpha_i \geq 0 \quad (1)$$

This function may be minimized with respect to the radius R and center 'a' and maximized with respect to Lagrangian $\alpha_i$. Setting the partial derivatives of L to R and 'a' gives $$\sum \alpha_i = 1 \text{ so } \sum_i \alpha_i x_i / \sum_i \alpha_i = \sum_i \alpha_i x_i$$

To determine whether a test point z is within the sphere 710, the distance to the center of the sphere 710 is calculated. A test object 'z' is accepted when this distance from the center of the sphere is smaller than the radius, i.e., when $(z-a)^T(z-a) \leq R^2$. Expressing the center of the sphere in terms of the support vectors, objects are accepted when $$(z \cdot z) - 2 \sum_i \alpha_i (z \cdot x_i) + \sum \alpha_i \alpha_j (x_i x_j) \leq R^2 \quad (2)$$

In a further embodiment, an alarm is provided when an abnormal condition is detected for at least a predetermined amount of time. The time may be 30 seconds in one embodiment, but may vary significantly and may be set by an operator to reflect unique knowledge of the refinery or other plant utilizing flaring of gases. In further embodiments, a percentage of abnormal frame sequences over a desired period of time may be used to trigger an alarm. In still other embodiments, the type of abnormality may be used to determine whether or not to provide an alarm either regardless of duration, or perhaps over a shortened duration.

Figure 8A:
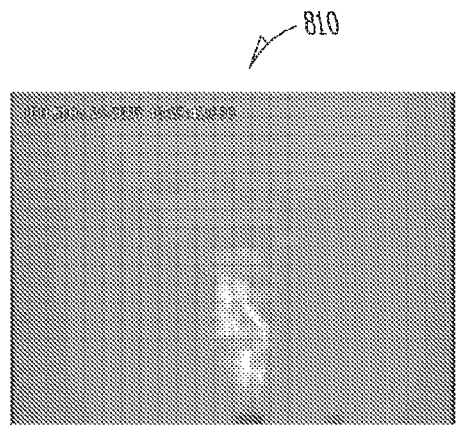
FIG. 8A is a flare image according to an example embodiment.
Figure 8B:
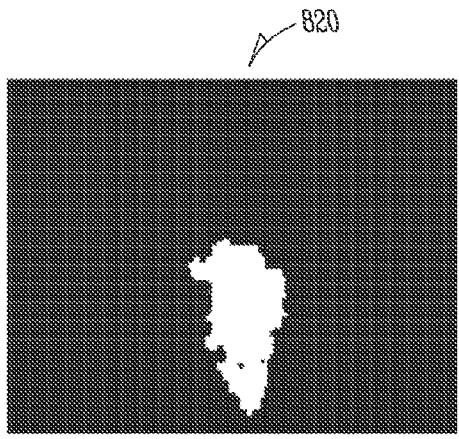
FIG. 8B is a screen shot of a detected flare according to an example embodiment.
Figure 8C:
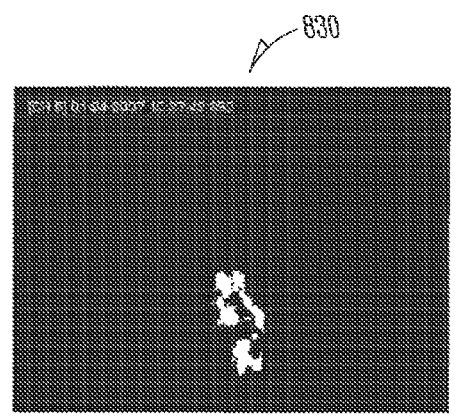
FIG. 8C is a screen shot illustrating a yellow color component of a flare image according to an example embodiment.
Figure 8D:
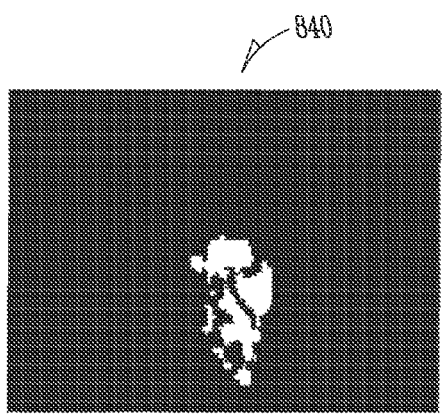
FIG. 8D is a screen shot illustrating an orange or red color component of a flare image according to an example embodiment.

Some of the results of the classification of a flare image in FIG. 8A and corresponding detected flare in FIG. 8B are shown in FIG. 8C at 830 and FIG. 8D at 840. Classified yellow color components are shown at 830, and classified orange or red color components are shown at 840.

The average flare volume in one embodiment may be computed once in N frames (where N may be set by the operator e.g. 30, 60, 120 etc.) by constructing a 3D model of the flare using multiple cameras and the set of averaged values collected over a period of time may be correlated with the flow sensor data in the corresponding interval and this is graphically represented to determine the flare trend in a given time window.

Figure 9:
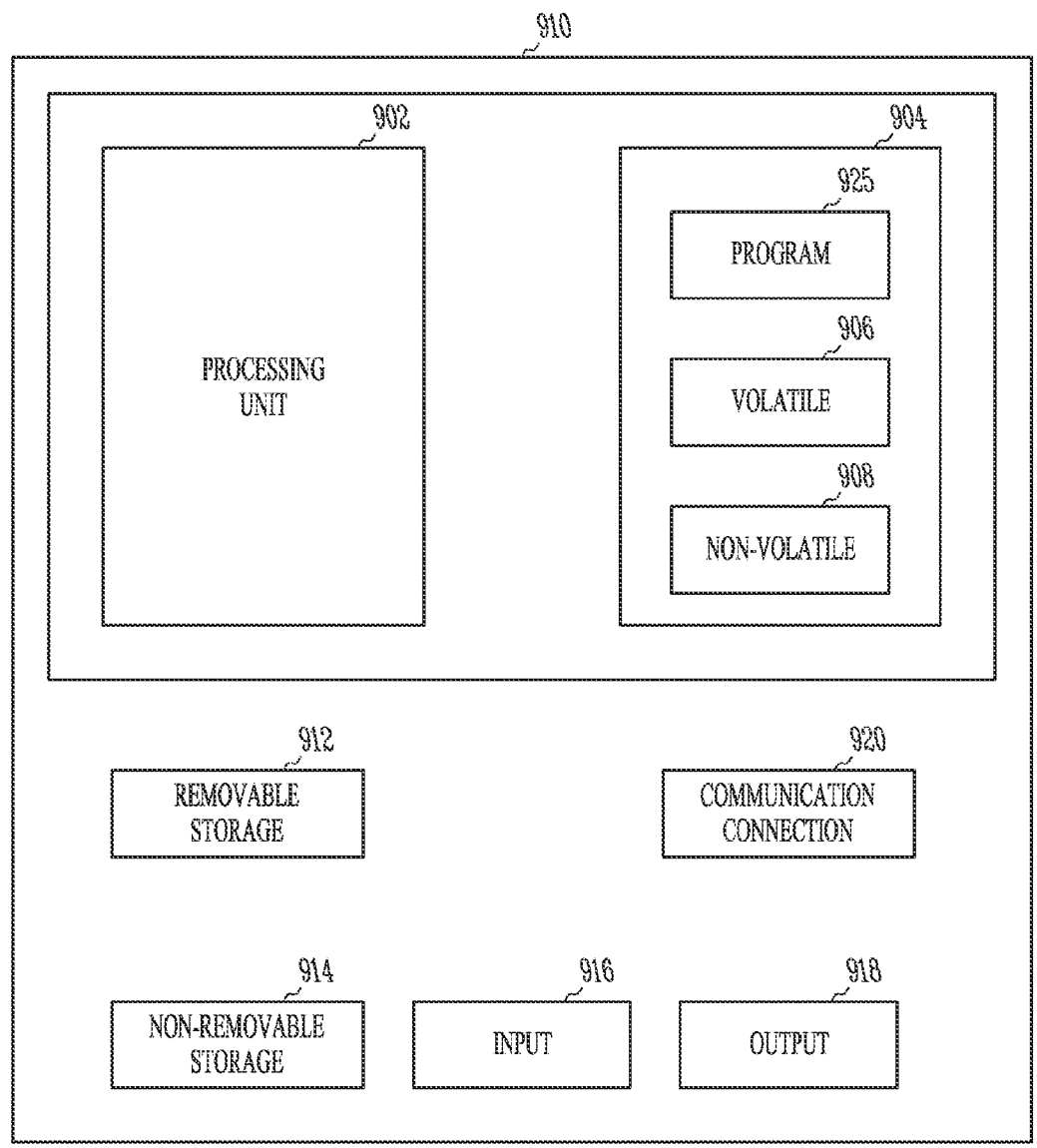
FIG. 9 is a block diagram of a computer system that executes programming for performing methods according to an example embodiment.

A block diagram of a computer system that executes programming for performing the above algorithm is shown in FIG. 9. A general computing device in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. Input 916 may include the above video camera or other digital image capturing device. Output 918 may include a display device to aid in training of the system to analyze flare. In some embodiments, the separate systems may be used for training and for live detection of flare. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

APPENDIX 1

Color Classification of the Flare Region Using One Class Classifier

The color component of the flare is a very useful cue to analyze different constituents of the gas that is being released. Separated flare pixels may be classified into different categories as defined by the user according to the gas properties. In the current work the flare pixels are classified as yellow, orange and blue regions and the percentage of each color present in the fame region is computed. Here, the major steps for classifying the flare pixel are: cluster the flare pixels and classify the cluster centers into various user defined categories.

The above three color classifiers may be applied to the flare regions. The color label in one embodiment is selected according to the maximum confidence value from the classifier by classifying the cluster centers In a further embodiment, SVDD may be used to find an optimal bounding hyper sphere around the target class, wherein the complete coverage of outlier pattern (in one embodiment, its background class) is not required. Hence a one class classifier like SVDD may be a better solution for some embodiments.

Color Model by SVDD:

SVDD-classifier: Support Vector Data Descriptor (SVDD) is a method generally used to describe the data samples. It defines a spherically shaped boundary with minimal volume around the target data set. A best representation of a data set is obtained such that the target class is optimally clustered and can be distinguished from the outlier class. In data domain description, the goal is to accurately describe one class of objects, the target class, as opposed to a wide range of other objects which are not of interest or are considered as outliers.

To describe the domain of a data set, the data is enclosed within a hyper-sphere description 710 with minimum volume as illustrated in a graphical representation in FIG. 7. The data may also be enclosed within a kernel description 720. By minimizing the volume of the captured feature space, the error (i.e. the chance of accepting outlier objects) may be minimized. Assume, a dataset contains N data objects, $X_i$, $i=1 \ldots N$ and the hyper-sphere is described by a center 'a' and radius R. To allow the possibility of outliers in the training set, the distance from $X_i$ to the center 'a' must not be strictly smaller than $R^2$, but larger distances should be penalized.

Therefore, a slack variable is introduced which measures the distance to the boundary if an object are outside the description. An error L containing the volume of the hyper sphere and the distance from the boundary of the outlier objects is minimized. The solution is constrained with the requirement that (almost) all data is within the hyper sphere:

$$L(R, a, \alpha_i) = R^2 - \sum_i \alpha_i R^2(x_i^2 - 2ax_i + a^2), \text{ with } \alpha_i \geq 0 \quad (1)$$

This function may be minimized with respect to the radius R and center 'a' and maximized with respect to Lagrangian $\alpha_i$. Setting the partial derivatives of L to R and 'a' gives $$\sum \alpha_i = 1 \text{ so } \sum_i \alpha_i x_i \bigg/ \sum_i \alpha_i = \sum_i \alpha_i x_i$$

To determine whether a test point z is within the sphere 710, the distance to the center of the sphere 710 is calculated. A test object 'z' is accepted when this distance from the center of the sphere is smaller than the radius, i.e., when $(z-a)^T(z-a) \leq R^2$. Expressing the center of the sphere in terms of the support vectors, objects are accepted when $$(z \cdot z) - 2\sum_i \alpha_i(z \cdot x_i) + \sum \alpha_i \alpha_j(x_i x_j) \leq R^2 \quad (2)$$

The invention claimed is:

1. A computer assisted method of identifying characteristics of a flare, the method comprising:
   obtaining a digital image of the flare;
   identifying a region of interest of said captured image;
   identifying flare pixels within said region of interest;
   extracting color information from the flare pixels;
   associating the extracted color information to characterizations of said flare; and
   providing an operator alert when such characterizations indicate an abnormal flare.

2. The method of claim 1 wherein identification of flare pixels is executed by change detection with background model.

3. The method of claim 1 wherein color information is extracted in a color space selected from the group consisting of RGB, HSV, YCbCr, and Normalized RGB.

4. The method of claim 1 wherein the association is executed by applying a flare color trained classifier.

5. The method of claim 4 wherein the flare color trained classifier is trained as a function of data representing flare constituent.

6. The method of claim 1 wherein the region of interest is identified by a minimum bounding rectangle.

7. The method of claim 1 and further comprising trend monitoring of the flare with respect to time and vented gas flow data obtained from flow sensors.

8. A non-transitory computer readable storage medium having instructions for causing a computer to implement a method of identifying characteristics of a flare, the method comprising:
   obtaining a digital image of the flare;
   identifying a region of interest of said captured image;
   identifying flare pixels within said region of interest;

extracting color information from the flare pixels;

associating the extracted color information to characterizations of said flare; and providing an operator alert when such characterizations indicate an abnormal flare.

9. The non-transitory computer readable storage medium of claim 8 wherein identification of flare pixels is executed by computer applying a classifier trained for flare detection.

10. The non-transitory computer readable storage medium of claim 8 wherein color information is extracted in a color space selected from the group consisting of RGB, HSV, YCbCr, and Normalized RGB.

11. The non-transitory computer readable storage medium of claim 8 wherein the association is executed by applying a flare color trained classifier.

12. The non-transitory computer readable storage medium of claim 8 wherein the flare color trained classifier is trained as a function of data representing flare constituent.

13. A computer system that identifies characteristics of a flare, the system comprising:
    a memory that stores a digital image of the flare;
    means for identifying a region of interest of said captured image;
    means for identifying flare pixels within said region of interest;
    means for extracting color information from the flare pixels;
    a classifier that associates the extracted color information to characterizations of said flare to identify an abnormal flare.

14. The computer system of claim 13 and further comprising a color video camera coupled to the memory that provides the digital image of the flare.

15. The computer system of claim 14 wherein the color video camera provides a digital video stream of the flare to the memory.

16. The computer system of claim 14 wherein the camera is positioned and set such that the flare occupies at least 10% of a camera field of view.

17. The computer system of claim 13 wherein the classifier provides an alert when characterizations represent an abnormal flare for a predetermined period of time.

18. A computer implemented method that identifies characteristics of a flare, the method comprising:
    determining a broad region of interest on a video image where the flare is determined to be present;
    detecting a flare area;
    analyzing color constituents of the flare to detect abnormal flare conditions; and
    providing an alarm when abnormal flare conditions are detected.

19. The method of claim 18 wherein the flare area is detected using a first manually trained classifier, and wherein color constituents of the flare are detected using a second manually trained classifier.

* * * * *